Aug. 17, 1943.    E. T. WOLFF ET AL    2,327,234
PUPPET SHOW
Filed Nov. 22, 1942    5 Sheets-Sheet 4
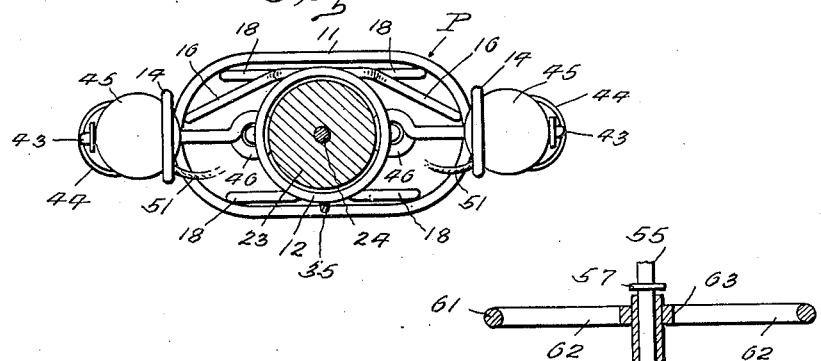
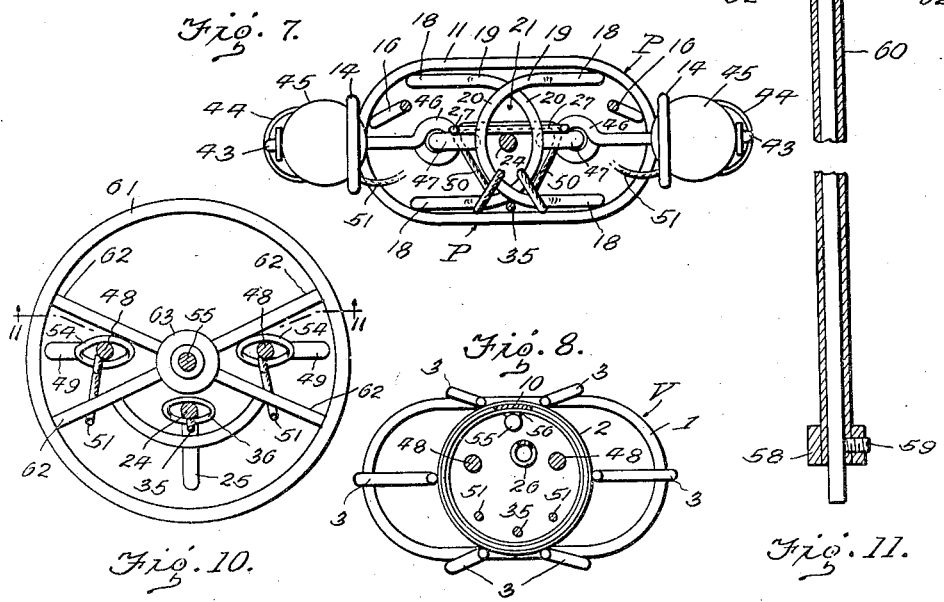
E. T. Wolff +
E. P. Wolff, INVENTORS E. T. Wolff & E. P. Wolff, INVENTORS Patented Aug. 17, 1943

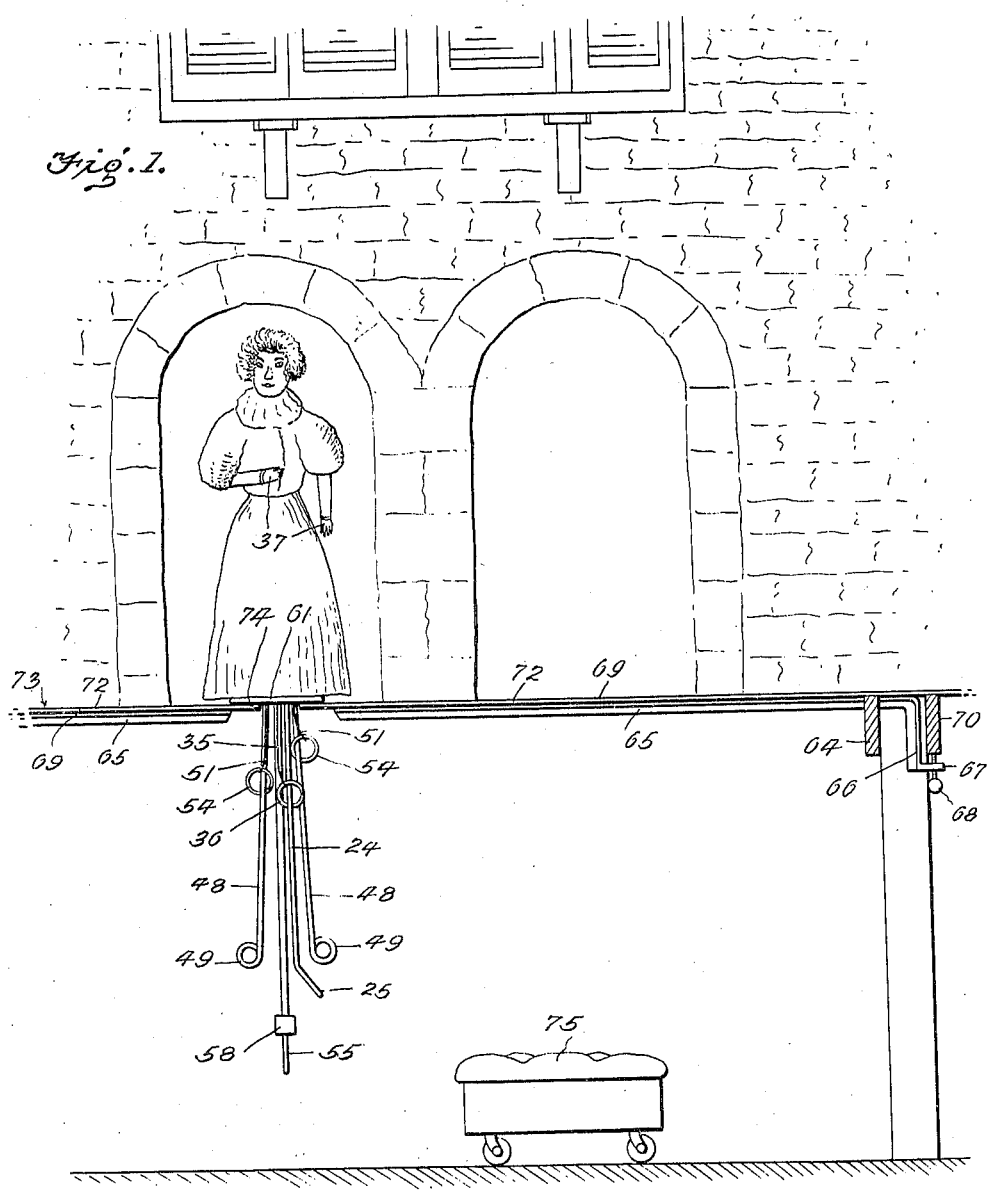

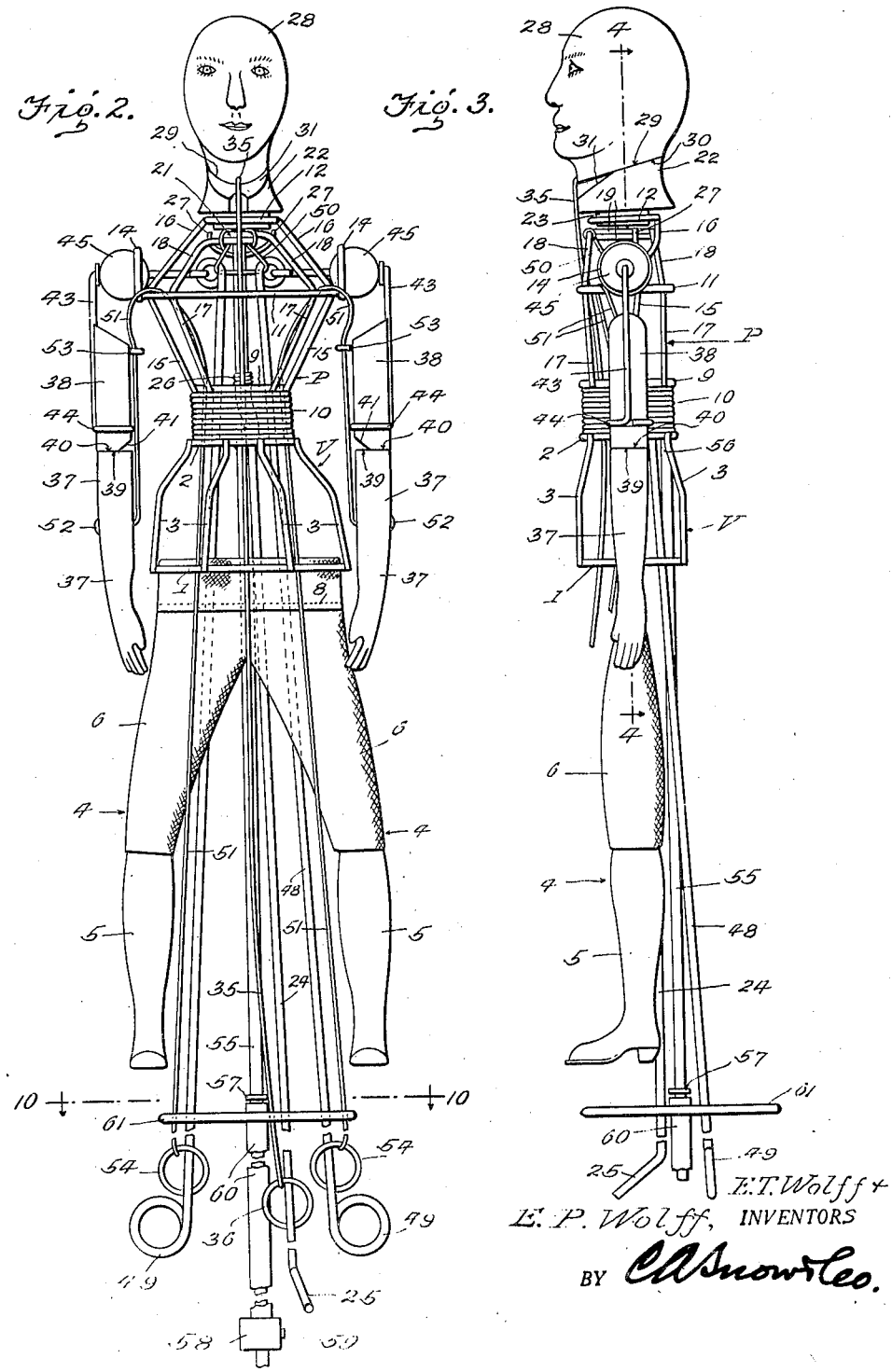

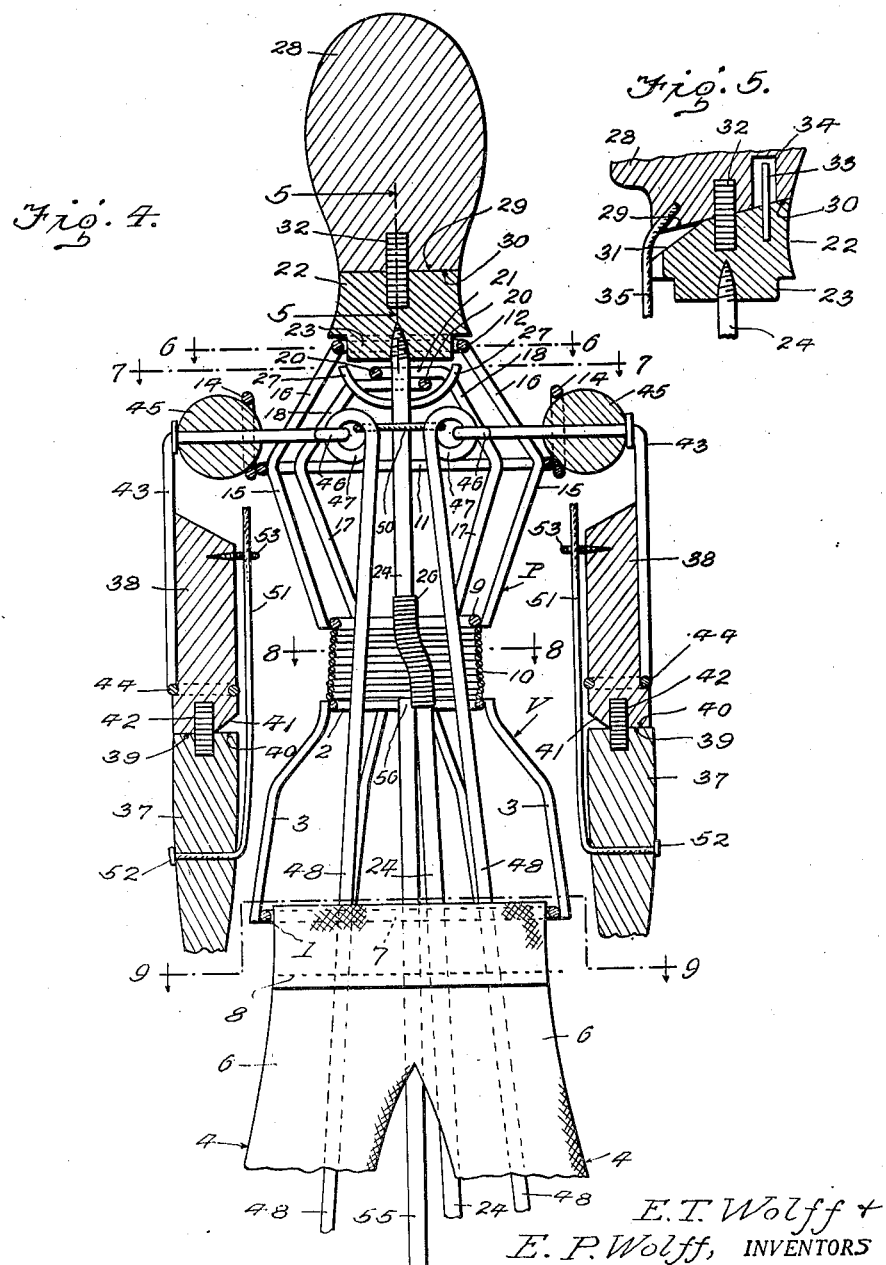

2,327,234

UNITED STATES PATENT OFFICE 2,327,234

PUPPET SHOW

Esther T. Wolff, Chicago, Ill., and Ernest Phillip Wolff, Curacao, Netherland West Indies Application June 22, 1942, Serial No. 448,050

5 Claims. (Cl. 46—126)

The device forming the subject matter of this application is a puppet show. The invention aims to provide a puppet body of novel construction, and to supply novel means for imparting motion to the arms and the head of the body. A further object of the invention is to furnish a puppet which can be manipulated completely from beneath the stage floor, overhead strings being unnecessary. Another object of the invention is to supply novel means for guiding the puppets, as they move about on a stage at the will of an operator.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in front elevation, a stage and scenery, together with a puppet constructed in accordance with the invention;

Fig. 2 is a front elevation of a puppet constructed in accordance with the invention;

Fig. 3 is a side elevation of the structure shown in Fig. 2;

Fig. 4 is a section on the line 4—4 of Fig. 3;

Fig. 5 is a section on the line 5—5 of Fig. 4;

Figure 12:
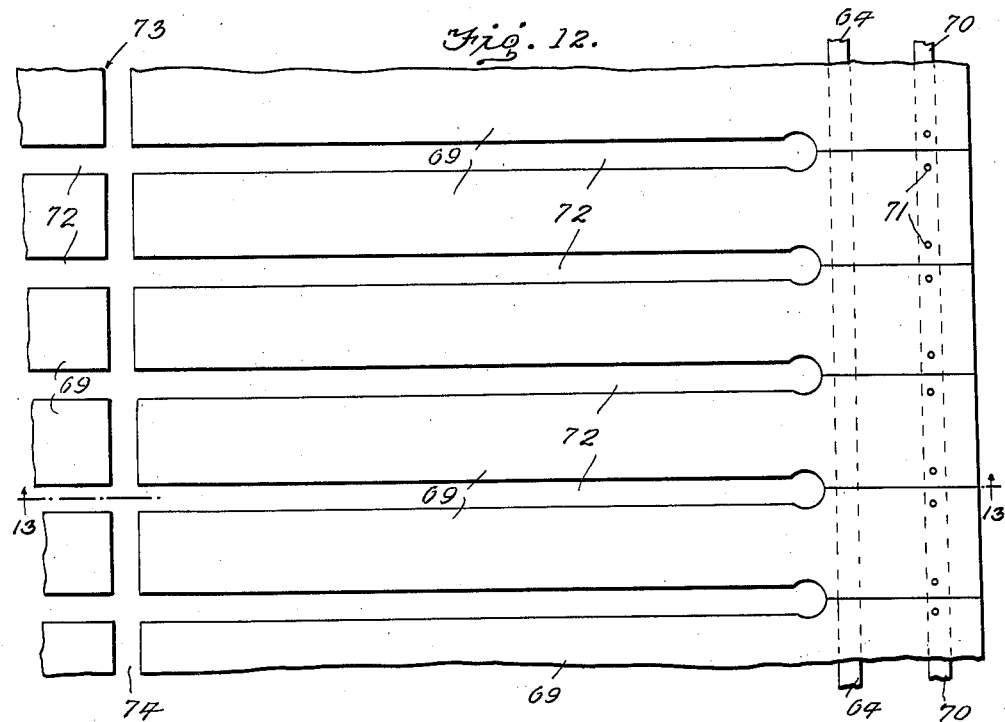
Figure 13:
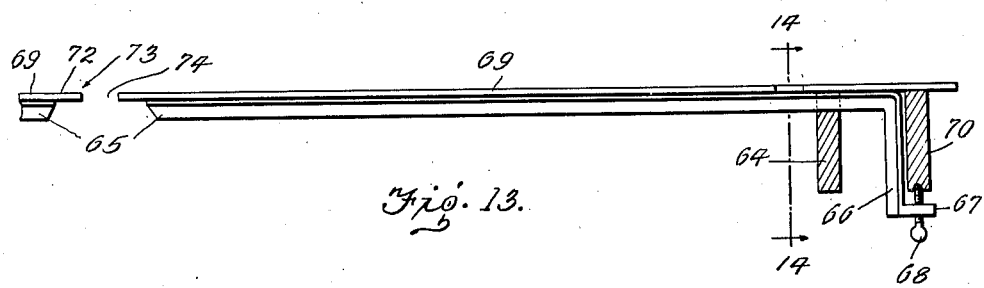
Figure 14:
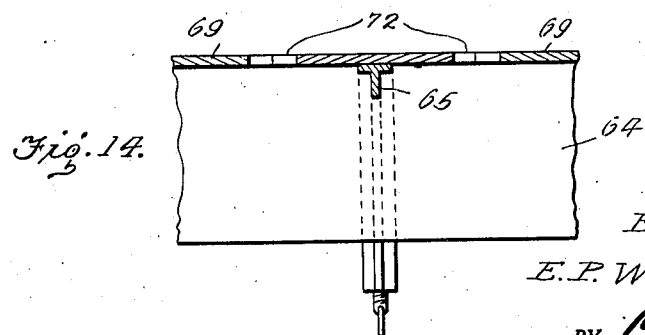

Figs. 6, 7, 8 and 9 are sections taken, respectively, on the lines 6—6, 7—7, 8—8 and 9—9 of Fig. 4;

Fig. 10 is a section on the line 10—10 of Fig. 2;

Fig. 11 is a section on the line 11—11 of Fig. 10;

Fig. 12 is a top plan of the stage door guide structure;

Fig. 13 is a section on the line 13—13 of Fig. 12;

Fig. 14 is a section on the line 14—14 of Fig. 13.

The puppet forming the subject matter of this application comprises a ventral or lower portion V, including a bottom ring 1, a top ring 2, and connections 3 joining the bottom ring with the top ring. The lower portion V of the puppet is shaped to conform to the human form, is rigid, and preferably is made of wire. The foregoing remark applies to other portions of the puppet, which can be picked out readily by a casual inspection of the drawings.

The legs are marked generally by the numeral 4. The calves and feet 5 may be rigid, and formed of a plastic, if desired. The thighs 6 are connected at their lower ends to the calves 5, and may be made of flexible, textile material, filled with any suitable stuffing. Above the crotch, the thighs 6 are flattened and bent over a cross piece 7 (Fig. 9) forming part of the lower ring 1. As shown in Fig. 2, the flap thus formed is stitched or secured otherwise, as at 8, to the main part of the thighs 6, and the legs 4, thus, are assembled with the lower portion V of the body for free swinging movement, as well as for folding movement, which can take place at the knees.

The pectoral or upper portion of the torso includes a lower ring 9, connected to the top ring 2 of the lower portion V of the puppet by a compacted, coiled spring 10, which affords a flexible connection between the ventral portion V and the pectoral portion P, at the waist line.

The upper portion of the torso comprises an intermediate ring 11, considerably larger than the lower ring 9, and an upper ring or bearing 12, of smaller diameter than the ring 9. Vertical ring bearings 14 are secured to the member 11, at the shoulders of the puppet.

Lower frame members 15 are connected at their lower ends to ring 9 of the torso, and are connected to the ring 11 at the shoulders of the puppet, the parts 15 having an upward and outward divergence. The frame members 15 merge, as indicated in Fig. 4, into upper frame members 16, having an upward convergence, the parts 16 being extended backwardly, as shown in Fig. 3, and being joined to the ring or bearing 12, at the back of the puppet.

At the front and at the back of the puppet, the ring 9 is connected to the ring 11 by upwardly and outwardly converging lower frame members 17. The frame members 17 merge into upper frame members 18, having an upward and inward convergence. As shown best in Fig. 7, each frame member 18 at the front of the puppet is joined to the corresponding frame member at the back on the puppet by a substantially horizontal U-shaped part 19. The bends of the parts 19 are overlapped as at 20 in Fig. 7, to form an eye 21, the overlapped portions 20 serving also as a hold-down, a statement which will be understood better when a reading of the specification is completed.

The numeral 22 designates a neck, provided at its lower end with a reduced stem 23, mounted to rotate in the upper ring or bearing 12. The neck 22 is rotated about a vertical axis by an operating member 24, preferably a rod, extended downwardly through the eye 21 of Fig. 7. The rod 24 is supplied at its lower end with a lateral handle 25, as Fig. 2 shows. The upper end of the rod 24 is mounted securely in the neck 22. The rod 24 is a two-part member, and the adjacent ends of the parts of the rod are connected, within the waist spring 10, by a coiled spring 26. Since the torso is laterally flexible in waist portion 13, the spring 26 affords corresponding flexibility in the rod member 24. The upper portion of the rod member 24 has transverse arms 27, which engage beneath the bends 20 and, thus, the neck 22 is held down for rotation in the upper ring or bearing 12.

The numeral 28 marks a head, having a continuous, downwardly and forwardly sloping lower surface 29, which rests on the correspondingly sloping upper surface 30 at the back of the neck 22. The neck 22 is provided, in advance of the surface 30, with a surface 31, which has a more pronounced downward and forward slant than does the surface 30. As shown in Fig. 5, a short pull spring 32 is terminally mounted in the neck 22 and in the head 28, to hold the surfaces 29 and 30, of the head and of the neck respectively, in contact, the head then standing upright, as shown in Fig. 3. A rotation of the head 28 with respect to the neck 22 is limited by a pin 33 (Fig. 5), having its lower end mounted in the neck 22, the upper portion of the pin being received in a recess 34, formed in the lower end of the head 28, the recess being enlarged slightly, from front to back, so that the head can tilt forwardly or backwardly.

Forward tilting movement of the head 28, against the action of the retractile spring 32 of Fig. 5, is secured through the instrumentality of a flexible operating member 35, extended downwardly through and below the torso, the flexible element being provided at its lower end with a ring 36, mounted to slide on the lower part of the rod 24 which brings about a rotation of the neck, as to a vertical axis.

The forearms are shown at 37, and upper arms at 38. The upper end surfaces 39 of the forearms 37 are at right angles to the lengths of the said arms. At their lower ends, the upper arms 38 have surfaces 40 at right angles to the length of the said arms, the surfaces 40 being disposed adjacent to surfaces 41, which have an upward slant. It is shown in Fig. 4 that the forearms 37 and the upper arms 38 are held together by pull springs 42, functioning like the springs 32 of Fig. 5. The construction is such that the forearms 37 and the upper arms 38 can have a natural folding movement, resembling closely the movement that takes place in the arms of a human being.

Rectangular suspension members 43 are provided and the vertical portions thereof extend downwardly along the upper arms 38, and terminate in ring clamps 44, seated in grooves in the upper arms. The horizontal portions of the suspension members 43 are mounted to rotate in journal members 45 of spherical form, the journal members being received for rotation in the ring bearings 14. At their inner ends, the horizontal portions of the suspension members 43 terminate in eyes 46, pivotally assembled with eyes 47 located at the upper end of control rods 48, passing downwardly through the torso, and provided with finger sockets 49 at their lower ends.

By moving the control rods 48 downwardly, through the instrumentality of the finger sockets 49, the suspension members 43 and the arm elements 37 and 38, will be caused to swing outwardly and laterally, away from the torso. In order to return the parts quickly to the depending position shown in Fig. 4, the eyes 47 at the upper ends of the control rods 43 are connected by a resilient cord 50, which is engaged through the bends 20 of the parts 19 that form continuations of the upper frame members 18 of Fig. 2.

Flexible elements 51 (Fig. 4) are provided, and have their lower ends secured to the forearms 37, as shown at 52. The flexible elements 51 pass upwardly through guides 53, carried at the inner sides of the upper arm members 38, near the upper ends thereof. Referring to Figs. 2 and 6, it will be observed that the flexible elements 51 pass downwardly over the intermediate ring 11 of the upper member of the torso, in contact with the ring bearings 14, in advance of a vertical plane passing through the centers of the ring bearings 14. When the flexible elements 51 are drawn downwardly, the first effect produced is to raise the arm members 38 and 37 without bending at the elbow: but if the strength of the pull is increased, a bending at the elbow will take place. The flexible elements 51 are supplied at their lower ends with rings 54, slidably mounted on the control rods 48.

The puppet has six controls.

The control rods 48 and the lever members 43 cause the arms 38—37 to swing outwardly.

The arms 37—38 can be swung upwardly and forwardly, and can be bent at the elbows, by pulling on the flexible elements 51.

The neck 22 and the head 28 are rotated about a vertical axis by the two-part rod 24 and the spring 26. The head 28 can be caused to tilt forwardly by drawing upon the flexible element 35.

A support for the puppet is provided. It includes a rod-like standard 55, having its upper end secured at 56 in Fig. 8 and as shown in Fig. 4, to the top ring 2 of the ventral portion of the puppet. By rotating the standard 55, the puppet can be turned on a vertical axis.

It appears in Fig. 11 that the standard 55 is supplied with a shoulder 57. A collar 58 is held by a set screw 59, on the standard 55, and retains on the standard, removably, a tubular carrier 60. The carrier 60 is provided at its upper end with a circular foot 61, connected by spokes 62 with the hub 63 of the carrier. Figure 10 shows that the spokes 62 tend to separate the various operating instrumentalities, to avoid entanglement or undue friction. Referring to Fig. 1, it will be noted that the foot 61 serves to support the puppet for shifting movement as an entity, in a way to be described hereinafter.

The tubular carrier 60 and the foot 61 can be slid readily off the standard 55, when the set screw 59 is loosened, the garbing of the puppets being the more readily accomplished.

Referring to Figs. 1, 12, 13 and 14 the numerals 64 and 70 designate fixed stage beams. Transverse, horizontal levers 65 are fulcrumed in the beam 64. At their forward ends, the levers 65 have depending arms 66 provided with forwardly presented horizontal fingers 67, into which are threaded adjusting screws 68.

Platform sections 69 are mounted on the levers 65. Near their outer ends, the platform sections 69 are secured at 71 to the beam 70.

In their adjacent edges, the platform sections 69 are supplied with recesses, defining slots 72. As shown in Fig. 1, the circular foot 61 rests on adjoining platform sections 69, the operating mechanism for the puppet being extended downwardly through the slot 72. If the platform sections 69 do not bear a flush relation to each other, the puppet will be tilted from an erect position. This can be avoided, by advancing the screws 68 of Fig. 13 to tilt the levers 65 until the platform sections are in proper alinement.

The forward part, only, of the stage has been described. The rear part of the stage is indicated at 73 in Fig. 12 and is constructed like the forward part of the stage and is capable of the same adjustment as the forward part of the stage. Between the rear ends of the platform sections of the forward part of the stage and the platform sections of the rear part of the stage, there exists a transverse slot 74, communicating with the slots 72 of both the front and rear portions of the stage. Owing to the presence of the slots 72 and 74, the puppet may be moved about by an operator, beneath the stage, to occupy such positions as the nature of the action may require.

If desired, a movably mounted seat 75, for the operator, may be disposed beneath the stage, as in Fig. 1.

The general construction of the device is such that, without overhead strings, the puppet may be manipulated to assume a variety of life-like positions, it being possible to move the puppet about as occasion may require.

Having thus described the invention, what is claimed is:

1. A stage for a puppet show, comprising outer and inner beams, platform sections secured to the outer beam and extended across the inner beam, levers fulcrumed intermediate their ends on the inner beam and engaging the lower surfaces of the platform sections, the levers extending under the outer beam, and means adjustable in the levers and engaging the lower edge of the outer beam to tilt the levers and level the platform sections.

2. A puppet comprising a torso, angle levers and means for fulcruming the levers at the shoulders of the torso, the fulcruming means comprising rings at the shoulders of the torso, and spherical members mounted on the inwardly extended segments, and seated for rocking movement in the rings, the levers comprising depending segments and inwardly-extended segments, arms connected to the depending segments, and depending operating members having their upper portions pivotally assembled with the inwardly-extended segments.

3. In a puppet, a pectoral member in the form of a frame including uprights having inwardly-extended, loop-shaped parts which are overlapped to define an eye, a neck supported for rotary oscillation on the upper end of the frame, an operating member extended upwardly through the eye and having its upper end secured to the neck, to secure rotary oscillation thereof, and transverse arms carried by the operating member and having hook portions engaged beneath the loop-shaped parts, to hold the neck seated for oscillation.

4. In a puppet, a torso, a plurality of body parts movably assembled with the torso, operating members assembled with the body parts, a downwardly-extended standard secured to the torso, a tubular carrier mounted on the standard, a supporting foot mounted on the standard, the operating members extending downwardly through the foot and being held spaced thereby, the carrier and the foot being removable from the standard, to permit a ready garbing of the puppet, and means for securing the carrier releasably to the standard.

5. In a puppet show, transverse beams, front and rear platform parts each comprising a plurality of parallel sections, the inner ends of the sections being free, the outer ends of the sections of the respective platform parts being attached to the respective beams, the inner ends of the sections of the respective platform parts being spaced to define a single cross-stage slot, the longitudinal edges of the sections of each platform part being spaced to form front-stage to back-stage slots communicating at their inner ends with the cross-stage slot, a puppet comprising a depending carrier extended below the platform and movable to occupy a position in any of the slots, a laterally-extended foot on the carrier, and means under the control of an operator for raising and lowering the inner end portion of each section of each platform part, thereby to afford a smooth stage-surface over which the foot may slide.

ESTHER T. WOLFF.
ERNEST PHILLIP WOLFF.